United States Patent [19]
Stoever et al.

[11] Patent Number: 5,743,366
[45] Date of Patent: Apr. 28, 1998

[54] AUTO-MODULATING HYDRAULIC CIRCUIT AND RELATED METHOD

[75] Inventors: Guy T. Stoever; Jimmie D. Clifford, both of Naperville, Ill.

[73] Assignee: Case Corporation, Racine, Wis.

[21] Appl. No.: 717,684

[22] Filed: Sep. 23, 1996

[51] Int. Cl.⁶ .............................. F16D 67/04; F16D 25/12
[52] U.S. Cl. ................ 192/12 C; 192/52.4; 192/85 R; 192/109 F
[58] Field of Search ........................ 192/12 C, 52.4, 192/85 R, 109 F

[56] References Cited

U.S. PATENT DOCUMENTS

| | | | |
|---|---|---|---|
| 3,550,507 | 12/1970 | Schott | 192/52.4 X |
| 3,669,229 | 6/1972 | Ronayne et al. | 192/12 C |
| 3,991,787 | 11/1976 | Schmitt et al. | 192/12 C X |
| 4,411,345 | 10/1983 | Haight et al. | 192/12 C |
| 4,560,044 | 12/1985 | Nagata | 192/52.4 |
| 4,951,795 | 8/1990 | Mori | 192/52.4 X |
| 4,974,711 | 12/1990 | Peterson, Jr. et al. | 192/12 D |

*Primary Examiner*—Richard M. Lorence
*Attorney, Agent, or Firm*—Jansson, Shupe, Bridge & Munger, Ltd.

[57] ABSTRACT

Disclosed is a modulating hydraulic circuit for controlling a clutch such as the clutch on a power takeoff (PTO) shaft. The circuit includes a throttling valve having (a) an inlet port for receiving hydraulic fluid from a source, and (b) a discharge port connected to the clutch. The discharge port is also connected to an accumulator which is at an accumulator pressure. The discharge port and the clutch are at a pressure generally proportional to the accumulator pressure. As accumlator pressure rises at a controlled rate, the clutch is progressively engaged. Optionally, the circuit includes a brake control valve for "softly" disengaging a PTO shaft brake as the accumulator pressure rises. A method for controlling the clutch includes flowing hydraulic fluid through hydraulic lines to a throttling valve connected to an accumulator and to the clutch, increasing pressure in the lines and progressively engaging the clutch.

19 Claims, 6 Drawing Sheets

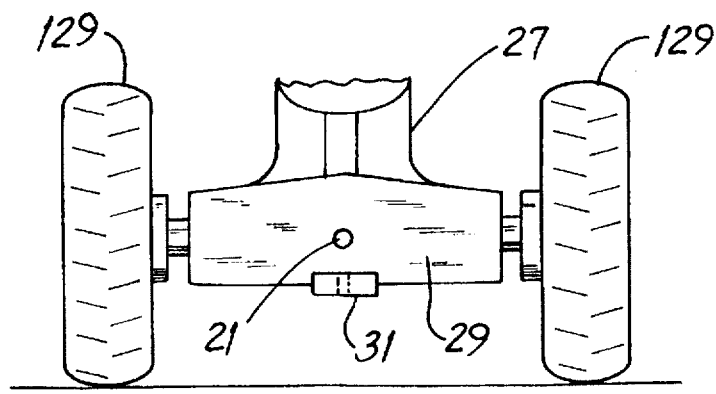
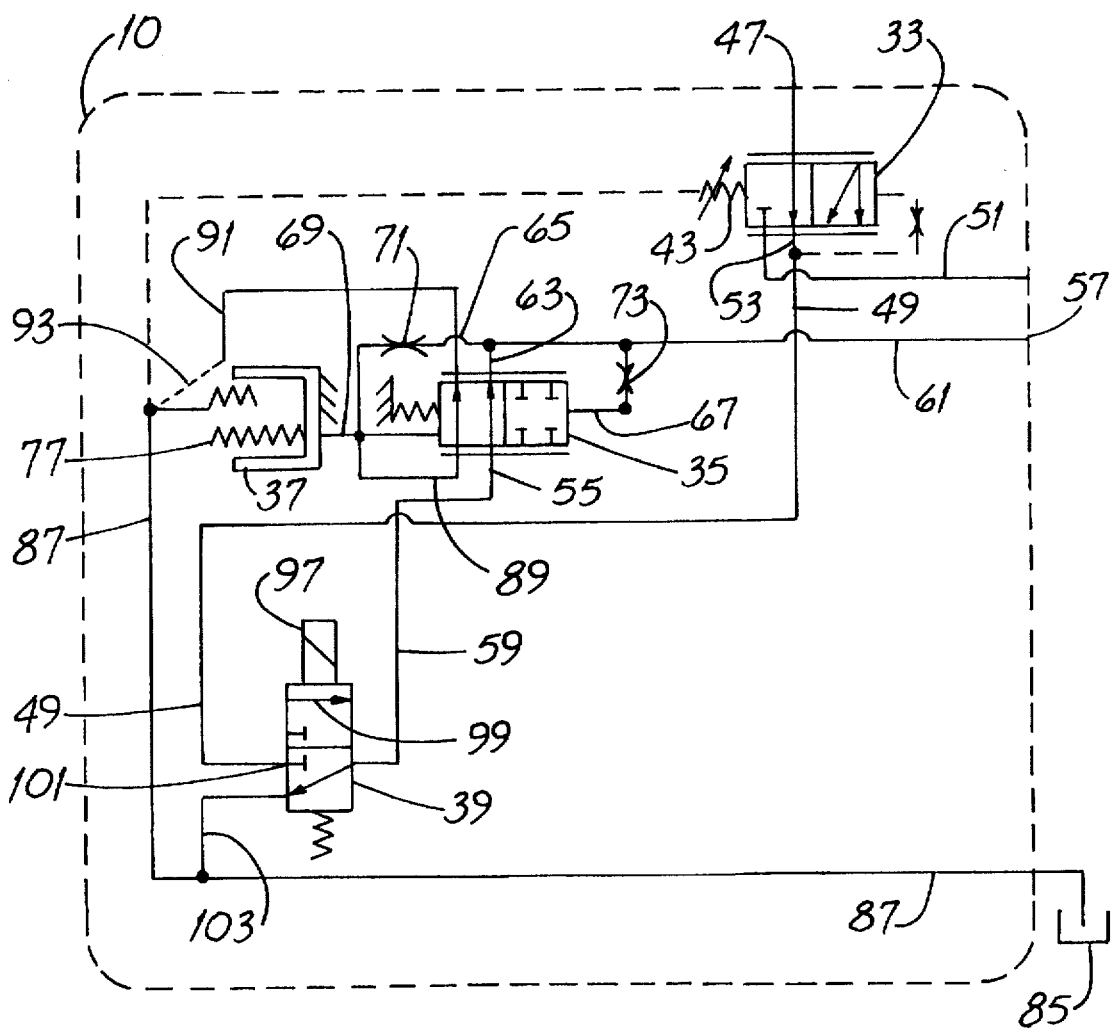

AUTO-MODULATING HYDRAULIC CIRCUIT AND RELATED METHOD

RELATED METHOD

1. Field of the Invention

The invention relates to clutches and power-stop control and, more particularly, to a hydraulic circuit for controlling a clutch.

2. Background of the Invention

Mechanical drive trains commonly employ a drive shaft coupled to and rotated by a prime mover such as an internal combustion engine or the like. Equally common are arrangements in which the drive shaft is coupled to the prime mover through some sort of clutch, thereby enabling an operator to power the drive shaft only when needed.

An example of a drive shaft clutch-coupled to an engine is the power takeoff (PTO) shaft at the rear of an agricultural tractor. If the tractor is being used as a "drawbar vehicle," i.e., to tow a plow, harrow or the like through a field, the PTO shaft is not used—plows and harrows usually have no PTO- powered components on them.

On the other hand, if the tractor is pulling an implement which itself has powered components, the PTO shaft is often used to drive such components. Examples of implements which may require power from the tractor PTO shaft include mowing sickles, towed (non-self-propelled) combines and windrowers. Such implements are configured in anticipation of a particular PTO shaft speed, e.g., 540 RPM or 1000 RPM, at a higher engine speed.

At least for reasons of a degree of energy conservancy, it is desirable to maintain the PTO shaft non-rotating until and unless power is needed at such shaft. To that end, many agricultural tractors have a clutch between the engine and the PTO shaft. Such clutch may be manually engaged by the operator when PTO power is needed and otherwise disengaged. And because PTO-powered implements may have a good deal of inertia and "coast" to a stop after the clutch is disengaged, some PTO drive trains include a brake between the clutch and the exposed, operator-accessible end of the PTO shaft.

A problem with arrangements of the foregoing types is that the operator sometimes engages the PTO clutch rather abruptly. A reasonable analogy is the driver of a manual shift ("stick shift") automobile who accelerates the engine and then quickly releases the clutch.

And the results are analogous. The PTO drive train components and the implement driven by the PTO experience mechanical shock (sometimes referred to as "torque shock") which can break drive train components. In any event, such components are unduly stressed and component life is unnecessarily shortened.

Yet another problem involves the relative timing of release of the PTO brake and engagement of the PTO clutch. If such brake is not substantially completely released when the PTO clutch starts to engage, the PTO shaft attempts to "drive through" the brake. At the least, unnecessary brake wear results.

U.S. Pat. No. 4,974,711 (Peterson, Jr. et al.) discloses an electrical system for controlling electrically-operated brakes and clutches. Such system uses a number of electrical relays, switches and coils and while such system is only tangentially-related to the invention, the patent illustrates an example of another application where clutch and brake control are of concern.

A auto-modulating hydraulic circuit and method which address and resolve the matter of engagement of a drive shaft clutch and, optionally, disengagement of a drive shaft brake in a way that avoids imposing substantial mechanical shock on the drive train of the equipment driven thereby and which avoids undue brake wear would be an important advance in the art.

OBJECTS OF THE INVENTION

It is an object of the invention to provide an auto-modulating circuit and related method which overcome some of the problems and shortcomings of the prior art.

Another object of the invention is to provide an auto-modulating circuit and related method which are suitable for use in connection with mechanical drive trains.

Another object of the invention is to provide an auto-modulating circuit and related method which provide controlled engagement of a drive train clutch.

Another object of the invention is to provide an auto-modulating circuit and related method which may be used in connection with clutches of PTO shafts including such shafts on agricultural tractors.

Yet another object of the invention is to provide an auto-modulating circuit and related method resulting in "modulated," i.e., progressive or "soft" clutch engagement.

Another object of the invention is to provide an auto-modulating circuit and related method which help avoid mechanical shock to drive train components.

Still another object of the invention is to provide an auto-modulating circuit and related method which, optionally, include modulated release of a drive train brake in coordination with clutch engagement.

Another object of the invention is to provide an auto-modulating circuit and related method which help avoid undue brake wear.

Yet another object of the invention is to provide an auto-modulating circuit which optionally incorporates structure to lock the vehicle differential. How these and other objects are accomplished will become apparent from the following descriptions and from the drawings.

SUMMARY OF THE INVENTION

In its highly preferred embodiment, the inventive circuit is especially well suited to control the clutch and brake of a PTO shaft. The invention involves an automatically-modulating hydraulic circuit for controlling a clutch of the type which is pressure-modulated for progressive clutch engagement. That is, the clutch is released (out of engagement) when clutch pressure is low and progressively engages (exhibits progressively less "slip" and transmits greater driving torque) with rising clutch pressure. At some maximum pressure, e.g., 300 psi, the clutch is fully engaged, does not slip and transmits (or is capable of transmitting) its rated torque.

The circuit includes a throttling valve that "chokes down" the flow of hydraulic fluid available to engage the clutch. To put it in other words, the throttling valve moves between a first position for freely flowing the fluid from the inlet port to the discharge port and a second position modulating or "throttling" the flow of fluid from the inlet port to the discharge port.

Such throttling valve has an inlet port for receiving hydraulic fluid from a pressure-regulated source and also has a discharge port connected to the clutch. The pressure-regulated source comprises a pressure-modulating valve that maintains a substantially constant pressure at its outlet port even though such pressure-modulating valve is connected to a fluid supply, e.g., a gear pump, at unregulated pressure. The outlet port of the pressure-modulating valve feeds the throttling valve and other circuit components.

The discharge port of the throttling valve is also connected to an accumulator, preferably a spring-type accumulator having a spring chamber connected to a circuit tank. (A spring-type accumulator has a movable member urged at low hydraulic pressure to one position by one or more springs and urged to another position by a higher hydraulic pressure.) Such accumulator is at an accumulator pressure which may range from, say, 0 psi to 300 psi, and the discharge port and the clutch are at a pressure generally proportional to the accumulator pressure.

In another aspect of the invention, the throttling valve discharge port is also connected to an accumulator drain line and the accumulator includes a member which moves as accumulator pressure increases and because of such pressure increase. Such member closes the drain line when the accumulator pressure rises to a closure pressure, e.g., about 20 psi. Connection of the discharge port to the accumulator and to the accumulator drain line is through a metering orifice. Such orifice controls the rate of rise of the pressure applied to the accumulator and to the clutch.

An attractive yet optional feature of the new circuit is that in a highly preferred embodiment, such circuit is configured to also control a brake in concert with the clutch being controlled. In a specific embodiment, the brake is of the type set by hydraulic fluid under pressure and released by spring force.

The new auto-modulating circuit includes a brake control valve and the discharge port of the throttling valve and the outlet port of the pressure-modulating valve are connected to such brake control valve, preferably through a metering orifice. (This is a different orifice from that used to connect such discharge port to the accumulator and accumulator drain line.)

Such brake control valve is preferably of the spring-biased type and moves between a first position (urged there by a spring) to set the brake and a second position (urged there by hydraulic pressure) to release the brake. When the brake control valve is in the second position, the hydraulic fluid (which otherwise would hold the brake engaged or "set") is vented to the tank, thereby permitting the brake spring to release such brake.

It is preferred that the choice of whether or not to "activate" the auto-modulating circuit to release the brake and engage the clutch be under the control of the machine operator. And, most preferably, such operator can make the selection from a remote location.

To that end, the highly preferred embodiment of the new circuit includes a solenoid-operated selector valve connected between the source and the throttling valve. The selector valve moves between a first position (urged there by a spring when the solenoid is de-energized) and a second position (urged there by the energized solenoid overcoming spring force) and includes a tank port connected to the circuit tank.

When the selector valve is in the first position, the discharge port of the throttling valve is connected to the tank. And when the selector valve is in the second position, the pressure source is connected to the inlet port of the throttling valve.

A new method for controlling a clutch which is pressure-modulated for progressive clutch engagement includes the steps of flowing hydraulic fluid through hydraulic lines to a throttling valve connected to an accumulator and to the clutch, increasing pressure in the lines and progressively engaging the clutch. As noted above, in a circuit used to practice the method, the accumulator is connected to a drain line and includes a movable member closing the drain line when the accumulator pressure rises to a closure pressure. The increasing step includes increasing pressure in the lines to the closure pressure. In a more specific aspect of the method, the flowing step includes moving a selector valve from a first position to a second position.

Other details of the invention are set forth in the following detailed description and in the drawings.

BRIEF DESCRIPTION OF THE DRAWINGS

FIG. 2 is a representative rear elevation view of an agricultural tractor showing the PTO shaft. Parts are broken away.

FIG. 3 is a hydraulic schematic diagram of a first embodiment of the new auto-modulating circuit.

DETAILED DESCRIPTION OF PREFERRED EMBODIMENTS

Figure 1:
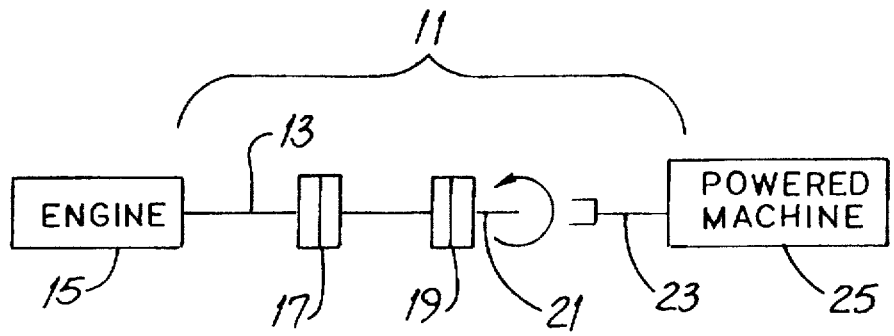
FIG. 1 is a representative view of an engine, mechanical drive train and powered machine.

Before describing details of the new auto-modulating circuit 10 and method, it will be helpful to have an understanding of some aspects of a mechanical drive train of a type with which the circuit 10 and method may be used. Referring to FIGS. 1 and 2, an exemplary mechanical drive train 11 includes an engine shaft 13 powered by an engine 15, a clutch 17, a brake 19 and an output shaft 21. The shaft 21 may be coupled to the input shaft 23 of a powered machine 25.

In an agricultural tractor 27, the output shaft 21 is referred to as a PTO shaft and is available to the operator at the rear 29 of the tractor. A towed implement requiring power from such shaft 21 is coupled to the hitch 31 and the implement input shaft 23 is coupled to the PTO output shaft 21 as described above.

The clutch 17 is of the type which is hydraulically-operated and, more specifically, is hydraulic-pressure-modulated for progressive clutch engagement. That is, such clutch 17 is spring-released (out of engagement) when clutch pressure is low and progressively engages (exhibits progressively less "slip" and transmits greater driving torque) with rising clutch pressure which overcomes spring force. Similarly, the brake 19 is of the type in which progressively-increasing braking torque is applied by braking surfaces urged into contact with one another by hydraulic fluid under rising pressure. At low or no pressure, such brake 19 is released by spring force.

Referring also to FIGS. 3, 4, 5 and 6, the components of the first embodiment of the circuit 10 include a pressure-modulating valve 33, a throttling valve 35, a spring-type accumulator 37 and a selector valve 39. The operation of each component is explained below and this is followed by an explanation of how the components coact in the circuit 10. While it is possible to make the circuit 10 using individual components plumbed together, space and manufacturing economies result when the circuit 10 is configured as an integrated assembly 41.

Figure 4:
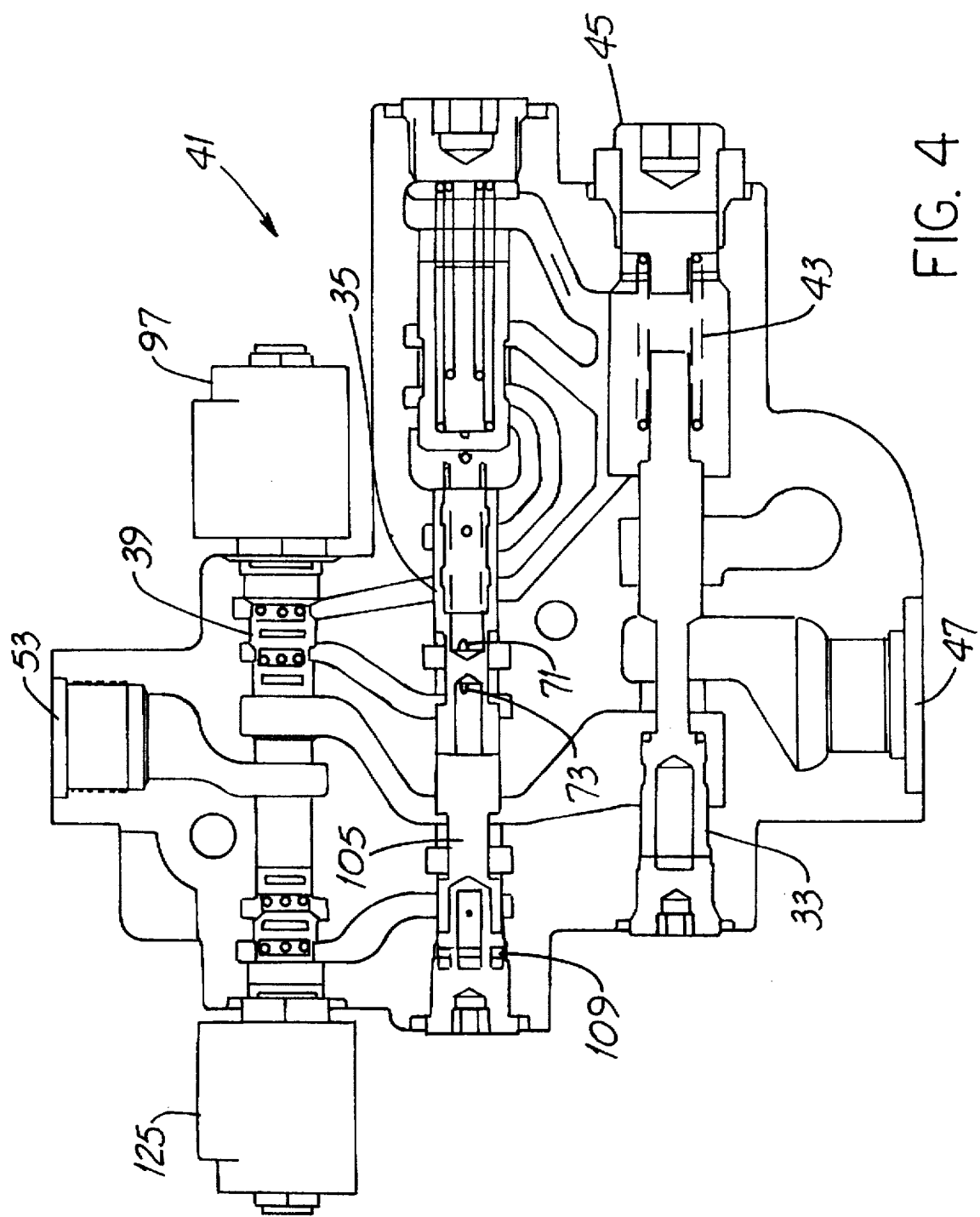
FIG. 4 is a cross-sectional elevation view of a "packaged" or integrated valve assembly embodying the new circuit. For clarity, cross-hatching is omitted.

In this specification, the term "setpoint" is used. Referring to the pressure-modulating valve 33, for example, the setpoint of such valve 33 would be the pressure at which the valve 33 starts to "throttle" or move against the urging force of the spring 43. The force exerted by the spring 43 is adjustable and a user-accessible adjustment device 45 as shown in FIG. 4 is provided for that purpose.

The pressure-modulating valve 33 has an infeed port 47 connected to a fluid supply (not shown), e.g., a gear pump, which exhibits pressure, the value of which is above the setpoint of the valve 33 but is unregulated. Such valve 33 is in the position shown in FIG. 3 until the pressure in the line 49 rises to the setpoint value, e.g., 300 psi. The valve 33 thereupon modulates and directs to a secondary line 51 fluid not needed to maintain such pressure. In effect, the valve 33 "splits" the available fluid supply between the line 49 (which has priority) and the line 51. In that way, the valve 33 maintains a substantially constant pressure at its outlet port 53 connected to line 49 even though the pressure at its infeed port 47 may vary widely.

The pressure-modulating valve 33 acts as a source of fluid for the throttling valve 35. Such fluid is at a predetermined, substantially-constant pressure. When the selector valve 39 is actuated, fluid from the valve 33 at a regulated pressure is directed through such selector valve 39 to the inlet port 55 of the throttling valve 35.

The throttling valve 35 is connected to the clutch 17 through the clutch port 57 and like the pressure-modulating valve 33, such throttling valve 35 modulates and "chokes down" flow of hydraulic fluid. As explained in more detail below, such valve 35 thereby modulates the rate at which hydraulic fluid is directed to the clutch 17. And such modulation controls the rate at which the clutch pressure rises.

Before actuating the selector valve 39 to engage the clutch 17, the pressure in the lines 59 and 61 is very low or substantially zero. When the selector valve 39 is actuated, the throttling valve 35 is at its first position (shown in FIG. 3) and freely flows fluid from the inlet port 55 to the discharge port 63 and to the lines 65, 67. It is to be noted that such port 63 is connected to the accumulator along the lines 65, 69 which have a metering orifice 71 (otherwise referred to as a "first metering orifice") in series therewith. Such orifice 71 controls the rate of fluid flow to (and therefore the rate of pressure rise in) the line 69 and the accumulator 37.

As pressure in the line 67 rises toward the throttling valve setpoint, e.g., about 20 psi, the valve 35 moves toward its second position (leftward in the view of FIG. 3) and modulates or "throttles" the flow of fluid from the inlet port 55 to the discharge port 63. Pressure feedback (the pressure signal that "tells" the throttling valve 35 what pressure is in the lines 61, 65, 69 and causes the valve 35 to modulate when the valve setpoint pressure is approached) is provided along the line 67 which has a second metering orifice 73 in series therewith.

Figure 5:
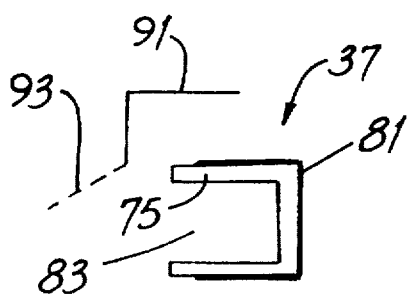
FIG. 5 is a symbolic view of a spring-type accumulator in its relaxed or low-pressure configuration.
Figure 6:
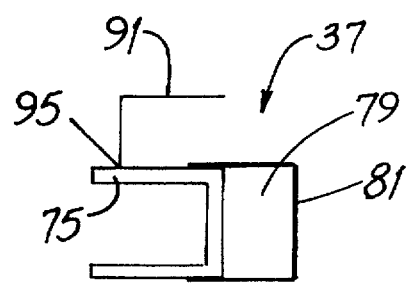
FIG. 6 is a symbolic view of the accumulator of FIG. 5 in its extended, pressurized configuration.

Referring particularly to FIGS. 3, 5 and 6, the spring-type accumulator 37 has a movable member 75 urged to one position (shown in FIGS. 3 and 5) by one or more springs 77 when the cavity 79 between the member 75 and the base 81 is at low pressure. Such member 75 is urged to another position (shown in FIG. 6) by a higher hydraulic pressure prevailing in the cavity 79. The accumulator spring chamber 83 is connected to a circuit tank 85 along the line 87. As explained in more detail below, the accumulator cavity 79 is at an accumulator pressure which may range from, say, 0 psi to 300 psi. The discharge port 63, the clutch port 57 and the clutch 17 are at a pressure generally proportional to the accumulator pressure.

Referring again to FIG. 3, the throttling valve discharge port 63 is also connected (through the line 65, the orifice 71 and the line 89) to an accumulator drain line 91. As indicated by the dashed line 93 and by the representations of FIGS. 3, 5 and 6, the drain line 91 is in flow communication with the tank line 87 when pressure in the cavity 79 is low. But when the member 75 moves as accumulator pressure increases, such member closes the drain line 91 as at location 95 when the accumulator pressure rises to a closure pressure, e.g., about 20 psi.

The operation of the circuit 10 of FIG. 3 will now be described. Referring to FIGS. 1, 3 and 4, it is assumed that the clutch 17 is disengaged, that the pressure-modulating valve 33 has provided fluid under pressure, 300 psi for example, in the line 49 and that the throttling valve 35 and selector valve 39 are positioned as shown. When the operator undertakes to engage the clutch 17, s/he energizes the solenoid 97 (which, in symbolic terms, moves the rectangular "envelope" of valve 33 downwardly) and pressurized fluid is directed from the line 49, through the valve passage 99 and along the line 59 to the inlet port 55 of the throttling valve 35.

The pressure in the lines 61, 63, 65, 67, 69 starts to rise and reaches a level sufficient to urge the member 75 in a direction to close the drain line 91. Pressure in the lines 61, 63, 65, 67, 69 continues to rise (at a rate determined by the accumulator springs 77 and the orifice 71) and as it does so, the clutch 17 starts to engage and "softly" start driving the PTO-powered machine 25. Such clutch 17 is fully engaged at its rated pressure, e.g., about 300 psi.

When the selector valve solenoid 97 is de-energized, such selector valve 39 again moves to the position shown in FIG. 3. The line 49 is blocked or "deadheaded" at the valve port 101 and the pressure in the lines 61, 63, 65, 67, 69 diminishes relatively rapidly since the throttling valve inlet port 55 is then connected directly to tank through the lines 59, 103, 87. As pressure diminishes, the clutch 17 again releases.

Figure 7:
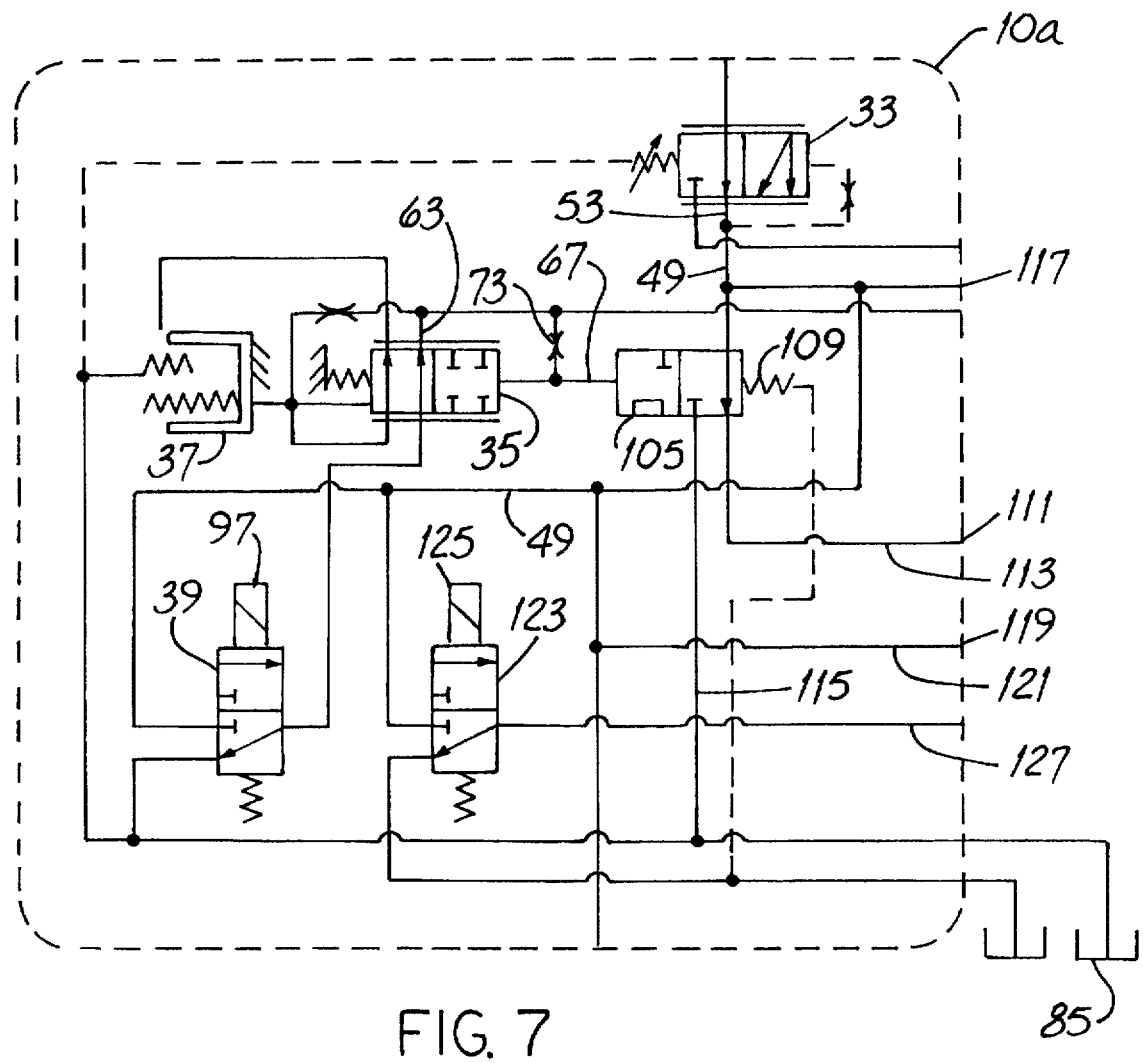
FIG. 7 is a hydraulic schematic diagram of a second embodiment of the new auto-modulating circuit.

Referring to all of the figures and particularly to FIGS. 4 and 7, another embodiment of the new circuit 10a includes an attractive optional feature. In a highly preferred embodiment, such circuit 10a is configured to also control a brake 19 in concert with the clutch 17 being controlled.

In this embodiment, the new auto-modulating circuit 10a includes a brake control valve 105. In the absence of pressure in the line 67 adequate to bias the valve 105, such valve 105 is retained in the illustrated first position by a spring 109. In such position, the pressurized fluid in the line 49 is applied to the brake 19 through the brake port 111. The brake 19 is thereby applied or "set."

With solenoid 97 energized, the discharge port 63 of the throttling valve 35 and the outlet port 53 of the pressure-modulating valve 33 are connected to line 67, preferably through the orifice 73, to bias such brake control valve 105. As pressure rises in the line 67 (for the reasons described above), the valve 105 is urged to its second position. In symbolic terms, the rectangular envelope representing valve 105 is moved rightwardly.

In such second position, the hydraulic fluid (which otherwise would hold the brake 19 engaged or "set") is vented to the tank 85 from the brake 17 through the valve path comprising the port 111 and the lines 113, 115. This "relaxation" of brake pressure permits the brake spring to release the brake 19. Brake release is in concert with clutch engagement. That is, the brake 19 is not fully released until the clutch 17 is capable of transmitting some amount of power but becomes fully released as the clutch 17 becomes fully engaged.

In the preferred embodiment, the new circuit 10a includes an auxiliary port 117 available to provide a regulated pressure source to other hydraulically-actuated devices on a machine 25. In a specific arrangement on an agricultural tractor 27, such port 117 powers all machine clutches other than the PTO clutch 17.

The new circuit 10a also includes an optional-but-desirable hydraulic line to a pressure switch port 119. If pressure in the line 121 (and therefore in the line 49) is below that needed to operate the clutch 17, a lamp on the tractor dashboard is illuminated. If the pressure deficiency is not corrected, the tractor 27 is automatically shut down.

Yet another optional feature of the new circuit 10a is a solenoid-operated differential lock valve 123. When the valve 123 is in the position shown in FIG. 7, the differential lock is at low pressure and, consequently, is de-activated. And when the solenoid 125 is energized and the valve 123 shifted, the differential lock is pressurized along the line 127 and the machine differential is locked. Such differential lock is, similar in operation to a limited-slip differential on an automobile. The differential locks couples both driving wheels 129 together for better traction to prevent one wheel from "slipping out."

Figure 8:
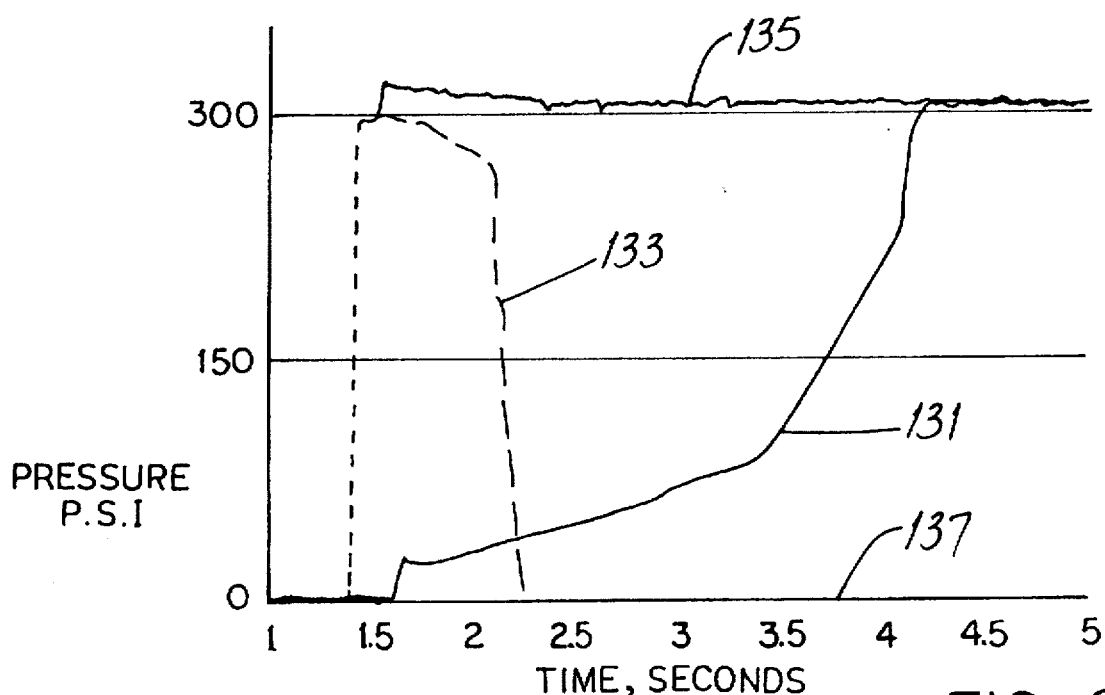
FIGS. 8 and 9 are graphs showing rising clutch-engagement pressure and declining brake-releasing pressure when the inventive circuit is actuated.
Figure 9:
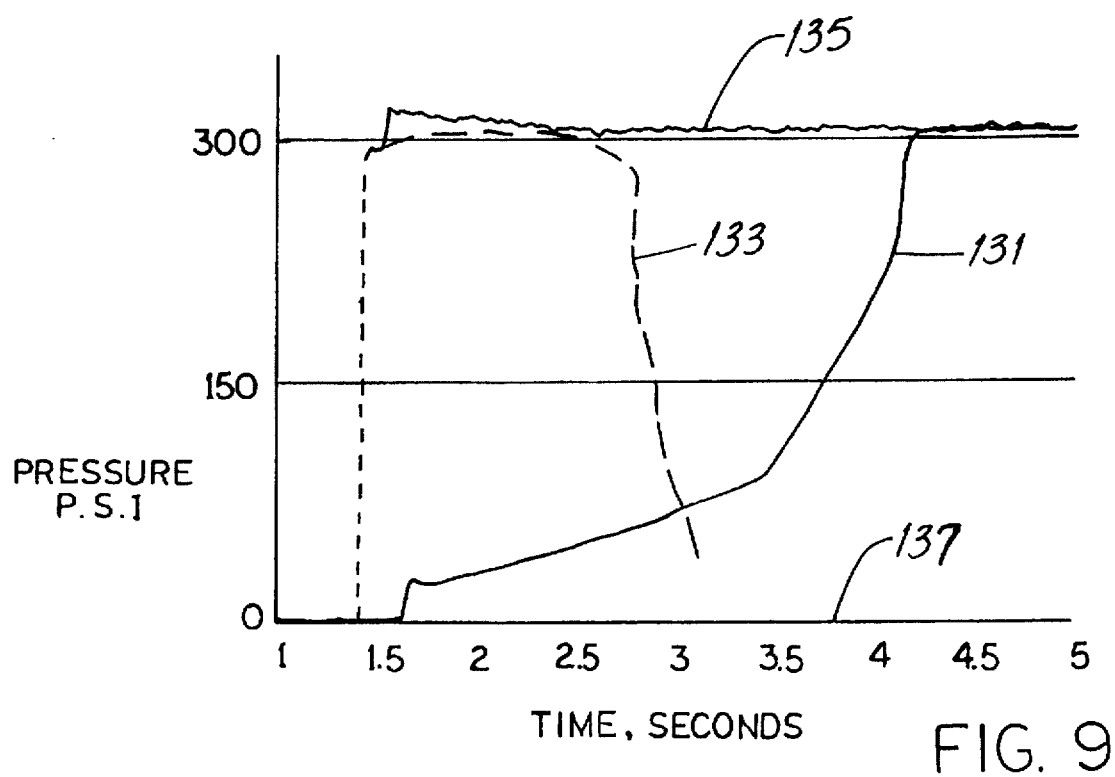
Figure 10:
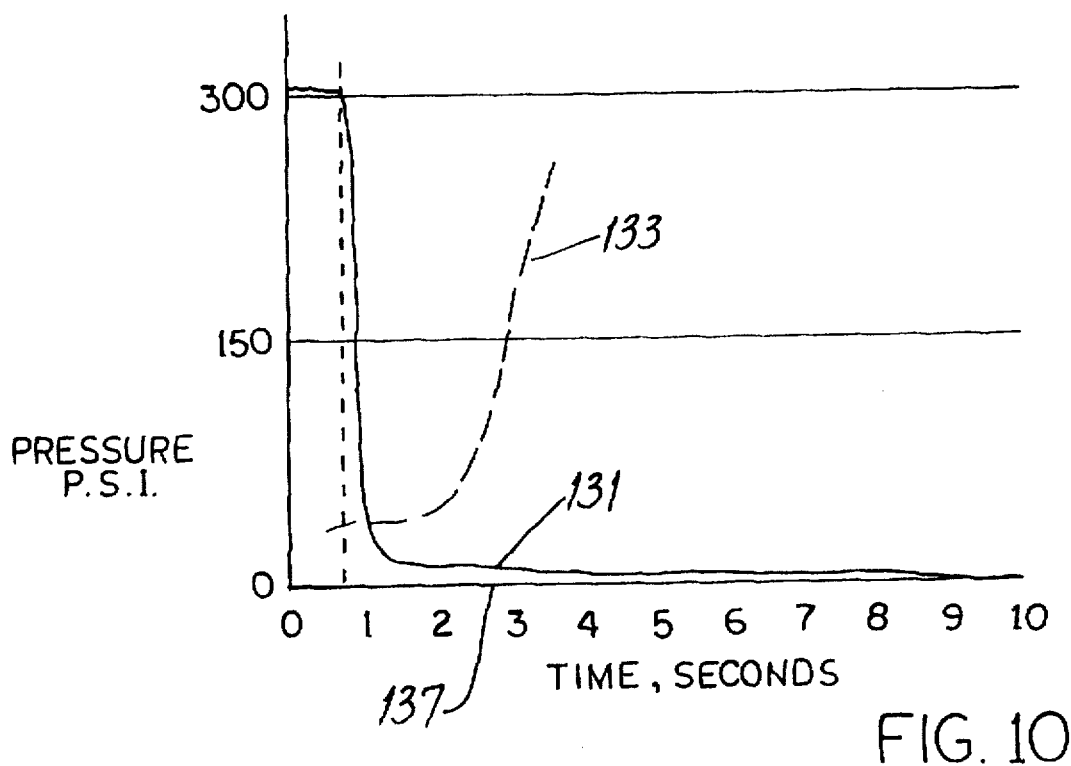
FIGS. 10 and 11 are graphs showing rising brake-setting pressure and declining clutch-releasing pressure when the inventive circuit is de-actuated.
Figure 11:
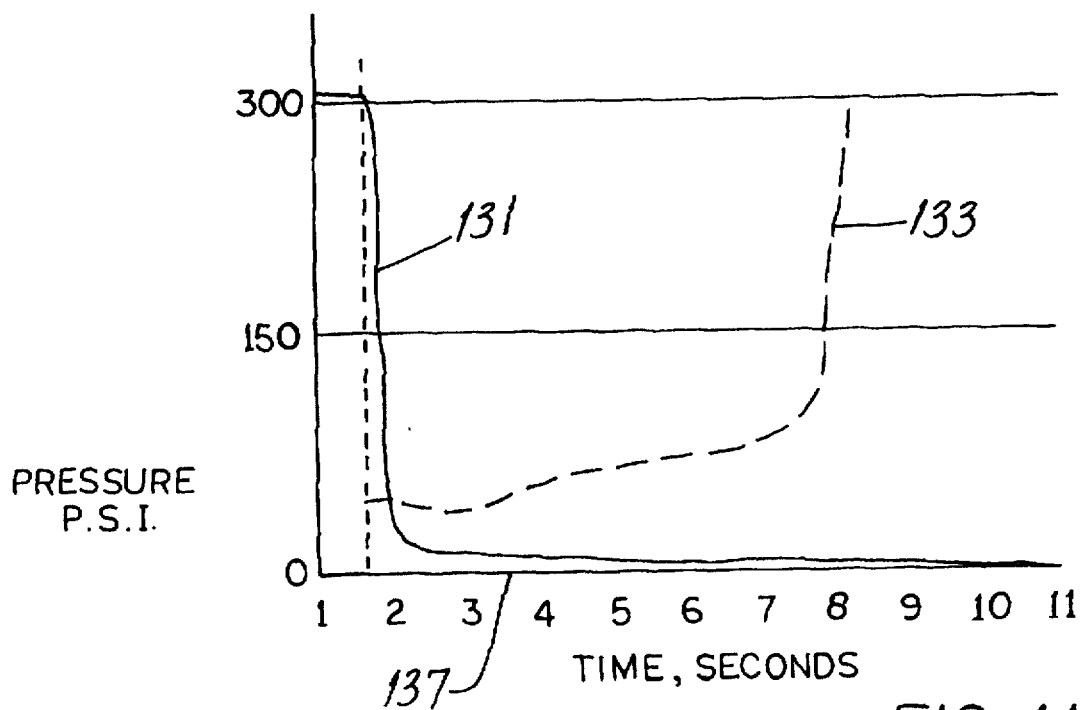

Performance advantages of the new circuit 10 or 10a will be aided by an understanding of the curves shown in FIGS. 8 through 13, inclusive. FIGS. 8, 9, 10 and 11 all include a curve 131 representing clutch pressure and a curve 133 representing brake pressure. FIGS. 8 and 9 also include a curve 135 representing the nominal regulated pressure at the outlet port 53 of the pressure-modulating valve 33. In FIGS. 8 and 9, time along the axis 137 is from when the solenoid 97 of the selector valve 39 is energized. In FIGS. 10 and 11, time along the axis 137 is from when the solenoid 97 of the selector valve 39 is de-energized.

FIGS. 8 and 9 both show pressure during brake releasing, which involves reducing brake pressure, and pressure during clutch engagement which involves raising clutch pressure. It is to be noted that in FIG. 8, the time at which the brake 19 starts to release, about 1.7 seconds, is significantly earlier than the corresponding time, about 2.7 seconds, indicated in FIG. 9.

The latter would be preferred if the PTO shaft 21 is driving a mechanism for which backward "coasting" would be undesirable because there is more clutch engagement/less clutch slippage before the brake 19 starts to release. FIGS. 8 and 9, illustrate the flexibility of performance afforded by the new circuit 10, 10a. Performance can be changed from that represented by FIG. 8 to that represented by FIG. 9 by further compressing the spring 109 on the brake control valve 105.

FIGS. 10 and 11 show pressure during clutch disengagement which involves reducing clutch pressure and pressure during brake setting which involves increasing brake pressure. In FIG. 10, the time at which the brake 19 starts to set, about 2.2 seconds, is significantly earlier than the corresponding time, about 5–6 seconds, indicated in FIG. 11. A circuit 10, 10a with the characteristics of FIG. 11 would be used if the operator has a PTO-powered load for which it is desirable to permit some coasting before applying the brake 19.

Figure 12:
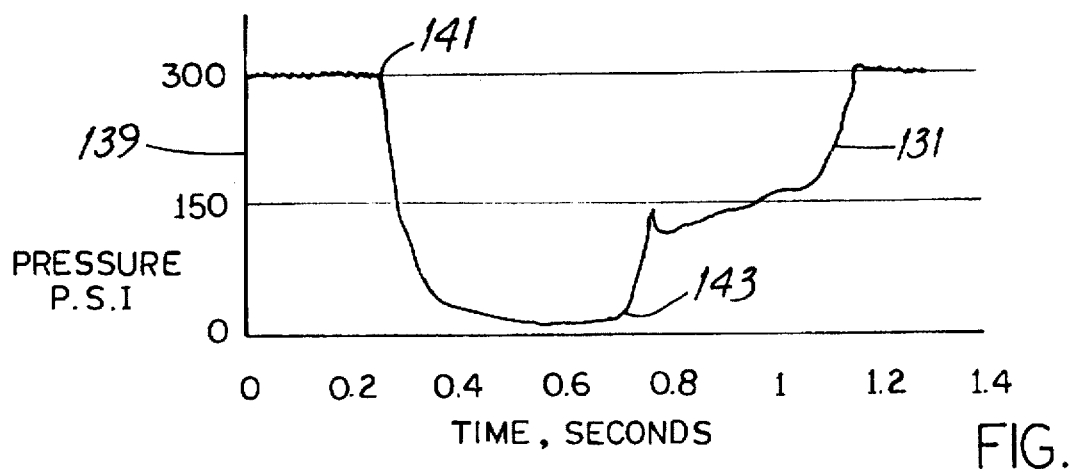
FIG. 12 is a graph showing clutch pressure when the inventive circuit is actuated, momentarily de-actuated and re-actuated.
Figure 13:
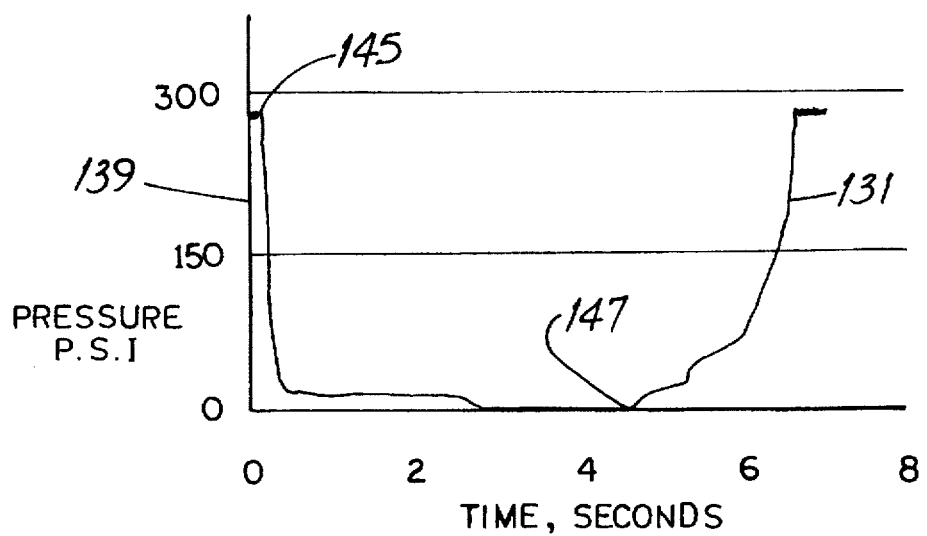
FIG. 13 is a graph showing clutch pressure when the inventive circuit is actuated, de-actuated for a time longer than that portrayed in FIG. 12 and then re-actuated.

In FIGS. 12 and 13, pressure applied to the clutch 17 is indicated on the vertical axis. FIG. 12 shows how clutch pressure changes if the selector valve solenoid 97 is de-energized (as evidenced by the start of pressure decline at the point 141) and re-energized (as evidenced by the steep rate of pressure increase at point 143) about 0.55 seconds later. FIG. 13 shows how clutch pressure changes if the selector valve solenoid 97 is de-energized (as evidenced by the start of pressure decline at the point 145) and re-energized (as evidenced by the steep rate of pressure increase at point 147) over 4 seconds later.

Referring to FIGS. 1 through 13, a new method for controlling a clutch 17 which is pressure-modulated for progressive clutch engagement includes the steps of flowing hydraulic fluid through hydraulic lines to a throttling valve 35 connected to an accumulator 37 and to the clutch 17, increasing pressure in the lines 61, 63, 65, 67, 69 and progressively engaging the clutch 17. As noted above, in a circuit 10, 10a used to practice the method, the accumulator 37 is connected to a drain line 91 and includes a movable member 75 closing the drain line 91 when the accumulator pressure rises to a closure pressure. The increasing step includes increasing pressure in the lines 61, 63, 65, 67, 69 to the closure pressure.

In a more specific aspect of the method, the flowing step includes moving a selector valve 39 from a first position to a second position. The method may also be practiced in a way to control a brake 19. Such method includes the steps of decreasing pressure in a brake line 113 and permitting the brake 19 to release under spring force.

While the principles of the invention have been shown and described in connection with but a few preferred embodiments, it is to be understood clearly that such embodiments are by way of example and are not limiting.

What is claimed:

1. In combination, a clutch and a modulating hydraulic circuit for controlling the clutch and including:

a throttling valve having (a) an inlet port for receiving hydraulic fluid from a source, and (b) a discharge port connected to the clutch;

and wherein:

the discharge port is also connected to an accumulator and to an accumulator drain line;

the accumulator includes a member which closes the drain line when the accumulator pressure rises to a closure pressure;

the accumulator is at an accumulator pressure; and the discharge port and the clutch are at a pressure generally proportional to the accumulator pressure.

2. The combination of claim 1 wherein the discharge port is connected to the accumulator and to the accumulator drain line through a metering orifice.

3. The combination of claim 2 including a hydraulic tank and wherein:

the accumulator is a spring accumulator having a spring chamber; and the spring chamber is connected to the tank.

4. The combination of claim 1 wherein:

the circuit includes a pressure-modulating valve having an outlet port providing the source of hydraulic fluid.

5. The combination of claim 4 including a brake control valve and wherein the discharge port of the throttling valve and the outlet port of the pressure-modulating valve are connected to the brake control valve.

6. The combination of claim 1 including a brake control valve and wherein the discharge port is also connected to the brake control valve.

7. The combination of claim 6 wherein:

the brake control valve moves between a first position for setting the brake and a second position for releasing the brake; and the discharge port is connected to the brake control valve, through a metering orifice.

8. The combination of claim 7 including a tank and wherein:

the brake is set by hydraulic fluid under pressure; and when the brake control valve is in the second position, the hydraulic fluid is vented to the tank.

9. The combination of claim 1 including a selector valve connected between the source and the throttling valve.

10. The combination of claim 9 including a tank and wherein:

the selector valve includes a tank port connected to the tank;

the selector valve moves between a first position and a second position; and when the selector valve is in the first position, the discharge port is connected to the tank.

11. The combination of claim 10 wherein when the selector valve is in the second position, the source is connected to the inlet port.

12. The combination of claim 1 wherein:

the throttling valve moves between a first position for freely flowing the fluid from the inlet port to the discharge port and a second position metering the flow of fluid from the inlet port to the discharge port.

13. A method for controlling a clutch which is pressure-modulated for progressive clutch engagement including:

flowing hydraulic fluid through hydraulic clutch lines to a throttling valve connected to an accumulator and to the clutch;

increasing pressure in the clutch lines;

progressively engaging the clutch;

decreasing pressure in a brake line; and permitting a brake to release under spring force.

14. The method of claim 14 wherein:

the accumulator is connected to a drain line;

the accumulator includes a movable member closing the drain line when the accumulator pressure rises to a closure pressure;

and wherein:

the increasing step includes increasing pressure in the clutch lines to the closure pressure.

15. The method of claim 13 wherein the flowing step includes moving a selector valve from a first position to a second position.

16. In combination, a clutch and a modulating hydraulic circuit for controlling the clutch and including:

a brake control valve;

a pressure-modulating valve having an outlet port providing a source of hydraulic fluid;

a throttling valve having (a) an inlet port for receiving the hydraulic fluid from the source, and (b) a discharge port connected to the clutch;

and wherein:

the discharge port is also connected to an accumulator the accumulator is at an accumulator pressure; and the discharge port and the clutch are at a pressure generally proportional to the accumulator pressure;

the discharge port of the throttling valve and the outlet port of the pressure-modulating valve are connected to the brake control valve.

17. In combination, a clutch and a modulating hydraulic circuit for controlling the clutch and including:

a brake control valve;

a throttling valve having (a) an inlet port for receiving hydraulic fluid from a source, and (b) a discharge port connected to the clutch;

and wherein:

the discharge port is also connected to an accumulator;

the accumulator is at an accumulator pressure;

the discharge port and the clutch are at a pressure generally proportional to the accumulator pressure; and the discharge port is also connected to the brake control valve.

18. The combination of claim 17 further including a brake and wherein:

the brake control valve moves between a first position for setting the brake and a second position for releasing the brake; and the discharge port is connected to the brake control valve through a metering orifice.

19. The combination of claim 18 further including a tank and wherein:

the brake is set by hydraulic fluid under pressure; and when the brake control valve is in the second position, the hydraulic fluid is vented to the tank.

* * * * *